United States Patent
Creamer et al.

(10) Patent No.: US 7,467,278 B2
(45) Date of Patent: Dec. 16, 2008

(54) MEMORY TUNING FOR GARBAGE COLLECTION AND CENTRAL PROCESSING (CPU) UTILIZATION OPTIMIZATION

(75) Inventors: Thomas E Creamer, Boca Raton, FL (US); Curtis E Hrischuk, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 360 days.

(21) Appl. No.: 11/382,161

(22) Filed: May 8, 2006

(65) Prior Publication Data

US 2007/0260843 A1    Nov. 8, 2007

(51) Int. Cl.
  G06F 12/00 (2006.01)
  G06F 17/30 (2006.01)
  G06F 9/46 (2006.01)
(52) U.S. Cl. ................................. 711/170; 707/206
(58) Field of Classification Search ................. 711/170; 707/206
  See application file for complete search history.

(56) References Cited

U.S. PATENT DOCUMENTS

| | | | |
|---|---|---|---|
| 6,081,665 A | 6/2000 | Nilsen et al. | |
| 6,611,858 B1 | 8/2003 | Aravamudan et al. | |
| 2003/0140071 A1 | 7/2003 | Kawamoto | |
| 2003/0182597 A1 * | 9/2003 | Coha et al. | 714/38 |
| 2004/0072764 A1 | 4/2004 | Andreasson | |
| 2005/0149589 A1 | 7/2005 | Bacon et al | |

OTHER PUBLICATIONS

Velasco et al., "Dynamic Management of Nursery Space Organization in Generational Collection," IEEE, 2004.*
Siebert, Constant-Time Root Scanning for deterministic Garbage Collection; Computer Science, vol. 2027, pp. 304-318, Apr. 2001.
Xu, Cost Effective Flow Table Designs for High-Speed Routers: Architecture and Performance Evaluation; IEE Transactions on Computers, vol. 51, No. 9, pp. 1089-1099, Sep. 2002.
Azatchi, Hezi, An On-the-Fly Mark and Sweep Garbage Based on Sliding Views, OOPSLA '03, Oct. 26-30, 2003, Anaheim, California, SIGPLAN Notices, vol. 38, No. 11, pp. 269-81.

* cited by examiner

*Primary Examiner*—Matt Kim
*Assistant Examiner*—Shane Thomas
(74) *Attorney, Agent, or Firm*—Jean M. Sullivan, Esq.; Steven M. Greenberg, Esq.

(57) ABSTRACT

A method and computer program product for garbage collection sensitive load balancing is disclosed for memory tuning for garbage collection and CPU utilization optimization An application is benchmarked across multiple different heap sizes to accumulate garbage collection metrics and the garbage collection metrics accumulated during benchmarking are utilized to compute both CPU utilization and garbage collection time for each of a selection of candidate heap sizes. One of the candidate heap sizes can be matched to a desired CPU utilization and garbage collection time, and the matched one of the candidate heap sizes can be applied to a host environment.

2 Claims, 2 Drawing Sheets

US 7,467,278 B2

MEMORY TUNING FOR GARBAGE COLLECTION AND CENTRAL PROCESSING (CPU) UTILIZATION OPTIMIZATION

BACKGROUND OF THE INVENTION

1. Field of the Invention

The present invention relates to the field of memory management and more particularly to the field of garbage collection for memory management.

2. Description of the Related Art

Memory leakage has confounded software developers for decades resulting in the sometimes global distribution of bug-ridden, crash-prone software applications. Particularly in respect to those programming languages which permitted the manual allocation of memory, but also required the manual de-allocation of allocated memory, memory leakage has proven to be the principal run-time bug most addressed during the software development cycle. So prevalent a problem has memory leakage become, entire software development tools have been developed and marketed solely to address the memory leakage problem.

Memory leakage, broadly defined, is the gradual loss of allocable memory due to the failure to de-allocate previously allocated, but no longer utilized memory. Typically, memory can be reserved for data having a brief lifespan. Once the lifespan has completed, the reserved memory ought to be returned to the pool of allocable memory so that the reserved memory can be used at a subsequent time as necessary. Importantly, where memory leakage persists without remediation, ultimately not enough memory will remain to accommodate the needs of other processes.

Recognizing the importance of addressing the memory leakage problem, computer programming language theorists have developed the notion of garbage collection. Garbage collection refers to the automated analysis of allocated memory to identify regions of allocated memory containing data which no longer are required for the operation of associated processes. In the context of object oriented programming languages such as the Java™ programming language, when objects residing in memory are no longer accessible within a corresponding application, the memory allocated to the "dead" object can be returned to the pool of allocable memory.

The process of garbage collection can be time consuming and can result in a degradation of performance for a hosted application. A primary factor affecting the time consumption of a garbage collection operation can include heap size. Generally, the larger the heap size, the more time consuming a garbage collection operation can be. Heap size, however, can be limited for a virtual machine for a number of reasons unrelated to garbage collection. To circumvent the limitation on heap size, it is common to utilize multiple virtual machines for a single central processing unit (CPU) in order to support the execution of a hosted application. Notwithstanding, the typical garbage collection operation can fully utilize a supporting CPU such that a garbage collection operation in one virtual machine can degrade the performance of another virtual machine supported by the same CPU.

In most cases, the degradation of performance will have little impact on the performance of a hosted application as most hosted applications are not time sensitive. However, some classes of hosted applications, including soft real-time systems, depend upon consistent performance at a guaranteed level of Quality of Service (QoS). Generally, soft real-time systems include speech recognition and text to speech systems. As it will be well understood in the art, soft real-time systems prefer to avoid the degradation in performance caused by garbage collection.

BRIEF SUMMARY OF THE INVENTION

Embodiments of the present invention address deficiencies of the art in respect to load balancing in an enterprise environment and provide a novel and non-obvious method, system and apparatus for garbage collection sensitive load balancing. In a first embodiment of the invention, a method for memory tuning for garbage collection and CPU utilization optimization can be provided. The method can include benchmarking an application across multiple different heap sizes to accumulate garbage collection metrics and utilizing the garbage collection metrics accumulated during benchmarking to compute both CPU utilization and garbage collection time for each of a selection of candidate heap sizes. One of the candidate heap sizes can be matched to a desired CPU utilization and garbage collection time. As such, the matched one of the candidate heap sizes can be applied to a host environment.

In a particular aspect of the embodiment, a maximum CPU utilization can be determined that is acceptable for a QoS goal. In another aspect of the embodiment, a desired garbage collection time can be determined as a maximum garbage collection time consumed that is acceptable for a QoS goal. In both circumstances, multiple virtual machines can share a host platform without allowing the garbage collection process of each virtual machine to invalidate the QoS requirements for each other virtual machine.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for memory tuning for garbage collection and CPU utilization optimization. In accordance with an embodiment of the present invention, an application can be benchmarked across multiple different heap sizes to determine the rate of garbage collections, the amount of memory collected for each garbage collection activity, and the average duration of each garbage collection.

Utilizing metrics accumulated during benchmarking, both CPU utilization and garbage collection time can be computed for each of a selection of candidate heap sizes. Subsequently, a candidate heap size can be matched to a desired CPU utilization and garbage collection time and applied to the host environment.

Figure 1:
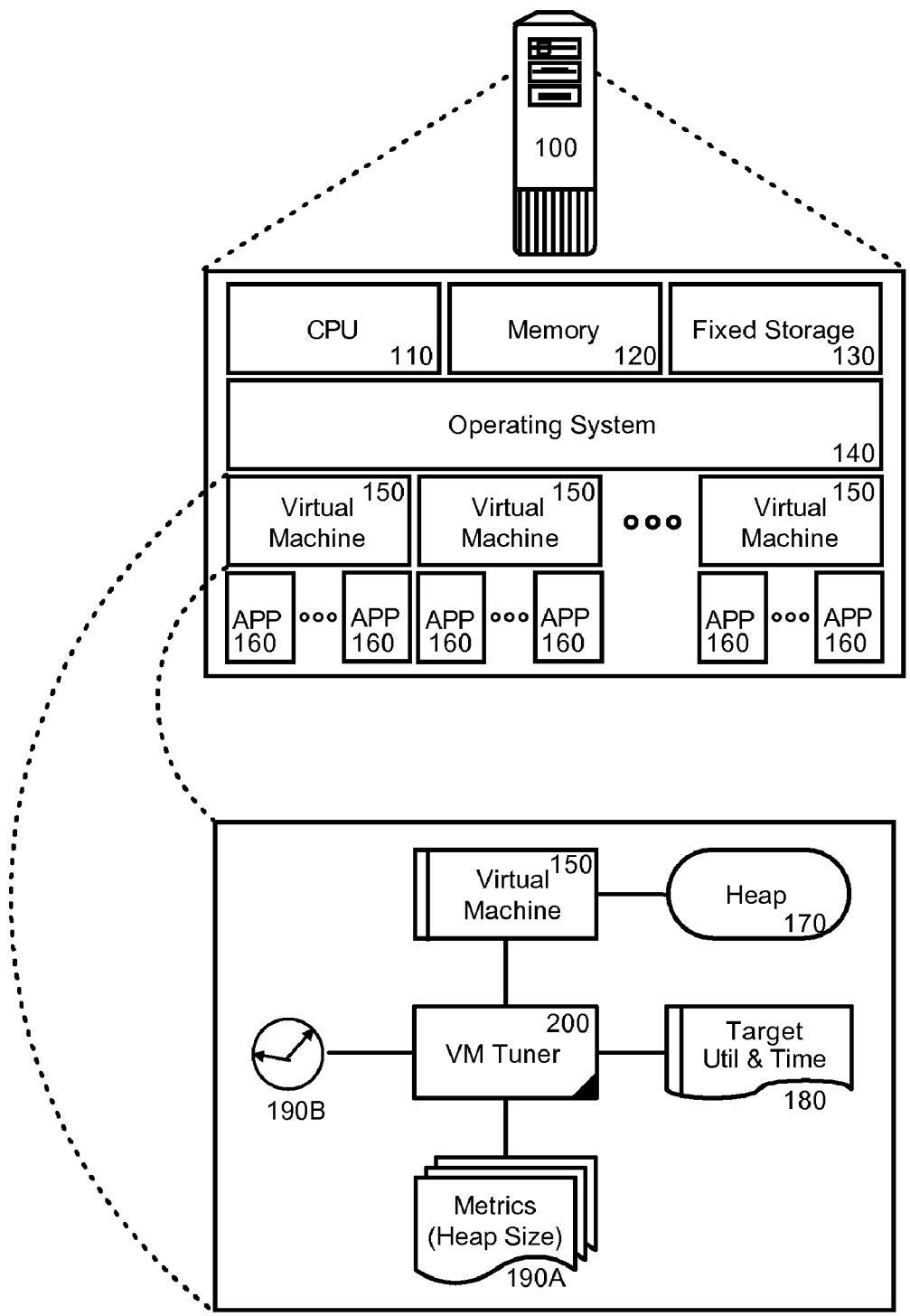
FIG. 1 is a schematic illustration of a memory tuning data processing system enabled for garbage collection and CPU utilization optimization; and, FIG. 2 is a flow chart illustrating a process for memory tuning for garbage collection and CPU utilization optimization.

In illustration, FIG. 1 is a schematic illustration of a memory tuning data processing system enabled for garbage collection time and CPU utilization optimization. The data processing system can include a host computing platform 100. The host computing platform 100 can include a CPU 110, current memory 120 and fixed storage 130. An operating system 140 can moderate the utilization of the CPU 110, current memory 120 and fixed storage 130 for one or more host virtual machines 150. It is to be noted, however, that the virtual machines 150 can directly moderate access to the CPU 110, current memory 120 and fixed storage 130 in the absence of an intermediate operating system 140. In any case, each virtual machine 150 can host the operation of one or more applications 160.

Each virtual machine 150 can be configured to maximally consume a set amount of memory according to a pre-configured heap size. In further illustration, a heap 170 can be allocated for use by the virtual machine 150. The selection of a heap size for the heap 170 can be applied by the virtual machine tuner 200. In this regard, the virtual machine tuner 200 can include program code enabled to benchmark an application 160 operating in the virtual machine 150 across multiple different heap sizes for the heap 170 utilizing timer/clock 190B. The benchmarking can produce CPU utilization and garbage collection time metrics 190A for each heap size. Consequently, utilizing the metrics 190A, a target CPU utilization and garbage collection time 180 can be matched to a particular heap size in order to select an optimal heap size for the heap 170. Further, each virtual machine 150 can be configured to limit the number of threads permitted to engage in garbage collection activities.

Figure 2:
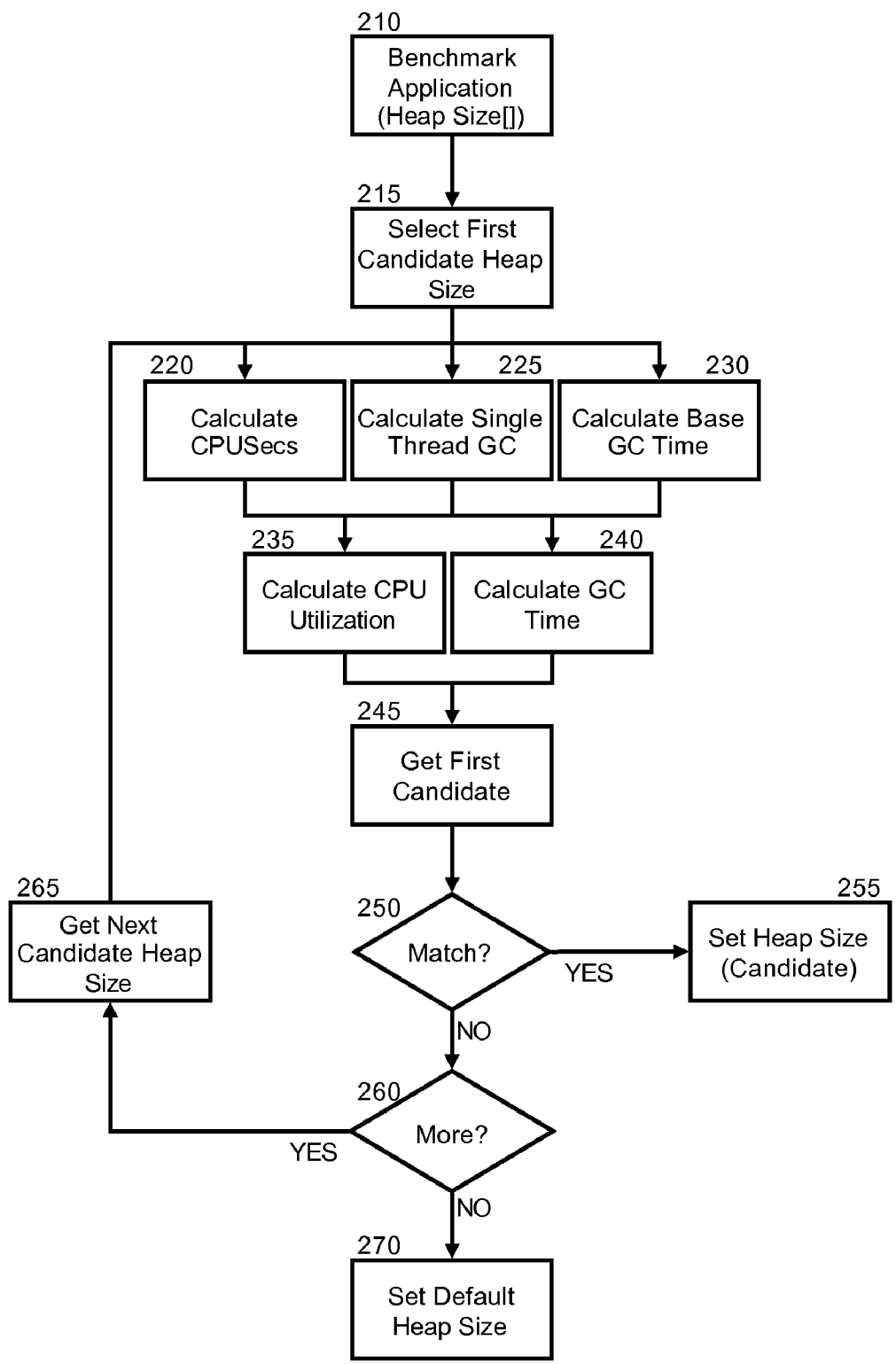

In more particular illustration of the operation of the virtual machine tuner 200, FIG. 2 is a flow chart illustrating a process for memory tuning for garbage collection and CPU utilization optimization. Beginning in block 210, an application can be benchmarked across a number of heap sizes for the virtual machine. In particular, the benchmarking process can include measuring a rate of garbage collections, an amount of memory collected in each garbage collection activity, and the average duration of each garbage collection. In block 215, a first candidate heap size can be selected for determining optimization. Additionally, QoS input parameters can be provided, including maximum garbage collection delay, maximum number of threads to be allocated for garbage collection and a maximum CPU utilization permitted.

In block 220, a number of CPU seconds used for each garbage collection activity for the candidate heap size can be computed by measuring CPU utilization for the garbage collection activity and multiplying the CPU utilization by the time consumed by the CPU in total during that period. Concurrently, in block 225, an amount of time consumed by a single thread performing the garbage collection activity can be computed. As well, a base garbage collection time can be computed in block 230. The base garbage collection time can include the minimal amount of time required to mark and sweep threads during mark and sweep style garbage collection.

In block 235, the CPU utilization for the candidate heap size can be computed as the number of CPU seconds used for each garbage collection divided by a number of threads involved in the garbage collection. Likewise, in block 240, a total garbage collection time can be computed for the candidate heap size as the base garbage collection time divided by the number of threads involved in the garbage collection combined with the average sweep time for the mark and sweep operation. Thereafter, in block 245 the resulting CPU utilization and total garbage collection time can be compared to pre-determined performance objectives.

If a match is found in decision block 250, in block 255 the candidate heap size can be established for the virtual machine. Otherwise, in decision block 260 if additional candidate heap sizes remain to be evaluated, in block 260 a next candidate heap size can be selected for analysis. Subsequently, the matching process can repeat through blocks 220 and 225 and 230. When no further candidate heap sizes remain to be analyzed, and if no match has been found for the pre-determined performance objectives in decision block 255, in block 270 a default heap size can be established for the virtual machine irrespective of the pre-determined performance objectives. In this circumstance, it can be recommended that additional processors are added to the machine to achieve optimization. Also, a number CPUs required to meet the pre-determined performance objectives, and a default number of recommended threads for garbage collection to meet the performance objectives can be recommended.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for memory tuning for garbage collection and central processing unit (CPU) utilization optimization, the method comprising:
   benchmarking an application across multiple different heap sizes to accumulate garbage collection metrics;
   utilizing the garbage collection metrics accumulated during benchmarking to compute both CPU utilization and garbage collection time for each of a selection of candidate heap sizes;
   matching one of the candidate heap sizes to a desired CPU utilization and garbage collection time; and,
   applying the matched one of the candidate heap sizes to a host environment, wherein
   the benchmarking an application across multiple different heap sizes comprises benchmarking an application across multiple different heap sizes to determine a rate of garbage collections, an amount of memory collected for each garbage collection activity, and an average duration of each garbage collection,
   the utilizing the garbage collection metrics accumulated during benchmarking to compute both CPU utilization and garbage collection time for each of a selection of candidate heap sizes comprises:
     computing CPU utilization for a candidate heap size as the number of CPU seconds used for a garbage collection divided by a number of threads involved in the garbage collection; and,
     further computing a total garbage collection time for the candidate heap size as a base garbage collection time divided by a number of threads involved in the garbage collection combined with an average sweep time for the garbage collection, the computing of the total garbage collection time for the candidate heap size, comprises computing a base garbage collection time as a minimal amount of time required to mark and sweep threads during mark and sweep style garbage collection for the garbage collection.

2. A computer-readable storage medium having stored therein computer instructions for memory tuning for garbage collection and central processing unit (CPU) utilization optimization, the computer instructions which, when executed by a computer system, cause the computer system to perform operations comprising:
   benchmarking an application across multiple different heap sizes to accumulate garbage collection metrics;
   utilizing the garbage collection metrics accumulated during benchmarking to compute both CPU utilization and garbage collection time for each of a selection of candidate heap sizes;
   matching one of the candidate heap sizes to a desired CPU utilization and garbage collection time; and,
   applying the matched one of the candidate heap sizes to a host environment, wherein
   the benchmarking an application across multiple different heap sizes comprises benchmarking an application across multiple different heap sizes to determine a rate of garbage collections, an amount of memory collected for each garbage collection activity, and an average duration of each garbage collection,
   the utilizing the garbage collection metrics accumulated during benchmarking to compute both CPU utilization and garbage collection time for each of a selection of candidate heap sizes comprises:
   computing CPU utilization for a candidate heap size as the number of CPU seconds used for a garbage collection divided by a number of threads involved in the garbage collection; and,
   further computing a total garbage collection time for the candidate heap size as a base garbage collection time divided by a number of threads involved in the garbage collection combined with an average sweep time for the garbage collection, the computing of the total garbage collection time for the candidate heap size, comprises computing a base garbage collection time as a minimal amount of time required to mark and sweep threads during mark and sweep style garbage collection for the garbage collection.

* * * * *